continued

UNITED STATES PATENT OFFICE 2,517,930

HALOGENATED AROMATIC COMPOUNDS

Sidney D. Ross and Moushy Markarian, North Adams, Mass., assignors to Sprague Electric Company, North Adams, Mass., a corporation of Massachusetts No Drawing. Application June 2, 1947,
Serial No. 751,994

5 Claims. (Cl. 260—649)

This invention relates to halogenated aromatic compounds and more particularly refers to halogen compounds containing three aryl nuclei.

It is an object of this invention to produce new and useful halogenated aromatic compounds. It is a further object to produce polyaryl halogenated compounds which are very stable at elevated temperatures and resistant to hydrolysis. A still further object is to produce new and improved dielectric compounds.

These objects are attained in accordance with the invention wherein there are produced halogenated aromatic compounds conforming to the general formula

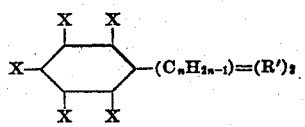

wherein $n$ is an integer from 1 to 10, R' is an aromatic hydrocarbon radical, and X represents a halogen atom.

In its preferred embodiment the invention is concerned with chlorinated aromatic compounds conforming to the general formula

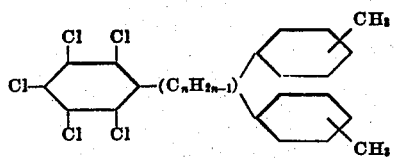

wherein $n$ represents an integer from 1 to 2.

In one of the specific embodiments of the invention there are produced chlorinated aromatic compounds conforming to the formula

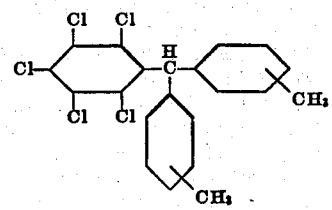

The invention is also concerned with the intermediates required for the preparation of the above compounds, as well as with the processes employed for making them.

We have found that halogenated aromatic compounds containing at least three aryl rings may be readily prepared and that these compounds possess highly desirable chemical, physical and electrical properties. Although all of the compounds of the invention contain at least five halogen atoms, they are extremely resistant to thermal or catalytic decomposition, as well as to hydrolysis in water.

Among the many compounds falling within the scope of the present invention are the following:

Pentachlorophenyl, diphenyl methane
Pentachlorophenyl, ditolyl methane
Pentachlorophenyl, dixylyl methane
1-pentachlorophenyl, 1,2-diphenyl ethane
1-pentachlorophenyl, 1,1-diphenyl ethane
1-pentachlorophenyl, 2,2-diphenyl ethane
1-pentachlorophenyl, 1,2-ditolyl ethane
1-pentachlorophenyl, 1,1-ditolyl ethane
1-pentachlorophenyl, 2,2-ditolyl ethane
1-pentachlorophenyl, 1,2-dixylyl ethane
1-pentachlorophenyl, 1,1-dixylyl ethane
1-pentachlorophenyl, 2,2-dixylyl ethane
Pentachlorophenyl, diphenyl propanes, etc.

The invention is particularly concerned with 1-pentachlorophenyl, 1,2-diphenyl ethane, pentachlorophenyl, diphenyl methane, 1-pentachlorophenyl, 1,2-ditolyl ethane, and pentachlorophenyl, ditolyl methane.

The following examples are representative of the compounds of the invention, the processes for making them and the intermediates required therefor.

EXAMPLE 1

*Preparation of pentachlorobenzal chloride*

75 grams of pentachloro toluene were heated to 225° C. and gaseous chlorine run in, until a net weight gain of 17.5 grams had been achieved. The reaction mixture was then distilled, the desired product coming over at about 175° C. under a reduced pressure of 2.2 mm. The melting point of this crude distillate, amounting in weight to about 80 grams, was 114° C. Upon crystallization, from an ethanol-benzene mixture, this was raised to 117–119° C.

EXAMPLE 2

*Preparation of pentachlorophenyl, diphenyl methane*

350 cc. of benzene and 1.5 grams of aluminum chloride were placed in a one liter, three necked flask equipped with a stirrer, reflux condenser, dropping funnel and thermometer. 66.7 grams of pentachlorobenzal chloride, prepared as described in Example 1 and dissolved in 150 cc. of benzene, were added over a period of one half hour. Very little evolution of hydrochloric acid took place up to this point, with the temperature at 29° C. The color gradually turned from water white to purple and the evolution of hydrochloric acid became fairly strong, after one and a half to two hours. The reaction was allowed to continue for about 20 hours at room temperature. The complex intermediate formed was decomposed with a hydrochloric acid-ice mixture, and the organic layer washed with 10% NaOH and then with water. The organic solution was dried over magnesium sulfate, and the benzene removed with a water pump vacuum. The residue amounted to 79 grams with a melting point of 105–119° C. Upon several crystallizations from benzene and alcohol (in a 1 to 3 ratio), the crystals melted at 127.5–128.5° C., representing the pure pentachlorophenyl, diphenyl methane.

The product was analysed for carbon and hydrogen as follows:

| Calculated | | Observed | |
|---|---|---|---|
| Per Cent Carbon | Per Cent Hydrogen | Per Cent Carbon | Per Cent Hydrogen |
| 54.80 | 2.66 | 55.15<br>55.05 | 2.74<br>2.52 |

EXAMPLE 3

*Preparation of 1-pentachlorophenyl, 1,2-dibromo ethane*

5 grams of pentachlorostyrene dissolved in 50 cc. of carbon tetrachloride was mixed with 2.9 grams of bromine dissolved in 100 cc. of carbon tetrachloride. The mixture was allowed to stand for seven days at room temperature in a clear flask. The solvent was removed to leave a white crystalline material with a melting point of 88–90° C. Upon recrystallization from acetic acid, the melting point was raised to 95–96° C., a yield of 4.5 grams of the pure 1-pentachlorophenyl, 1,2-dibromo ethane being obtained.

A carbon-hydrogen analysis performed on the product gave the following results:

| Calculated | | Observed | |
|---|---|---|---|
| Per Cent Carbon | Per Cent Hydrogen | Per Cent Carbon | Per Cent Hydrogen |
| 22.00 | 0.69 | 22.00<br>21.81 | 0.98<br>0.92 |

The dibromo compound may also be prepared by bromination of ethyl pentachlorobenzene. For example, one mole of ethyl pentachlorobenzene may be brominated at a temperature of 180–190° C. with one mole of bromine. The dibromide is obtained in a low yield as a byproduct of alpha-bromoethyl-pentachlorobenzene, the principal product.

Bromoalkyl pentachlorobenzenes are disclosed in greater detail in the copending application Serial Number 727,736, filed on February 10, 1947, by Ross et al.

EXAMPLE 4

*Preparation of 1-pentachlorophenyl, 1,2-diphenyl ethane*

A solution of 2 grams of the dibromide produced as described in Example 3 (1-pentachlorophenyl, 1,2-dibromo ethane) in 40 cc. of benzene was added drop-wise to a solution of 0.5 gram of aluminum chloride dissolved in 40 cc. of benzene. The mixture was warmed for three hours, at the end of which time a water solution of caustic alkali was added to decompose the complex intermediate formed. The benzene layer was separated and dried over magnesium sulfate. Removal of the unreacted benzene gave a crude product which was crystallized from ethyl alcohol to yield 1.1 grams having a melting point of 140–142° C. This is the desired 1-pentachlorophenyl, 1,2-diphenyl ethane.

A carbon-hydrogen analysis performed on the product gave the following results:

| Calculated | | Observed | |
|---|---|---|---|
| Per Cent Carbon | Per Cent Hydrogen | Per Cent Carbon | Per Cent Hydrogen |
| 55.80 | 3.04 | 56.11<br>56.30 | 3.10<br>2.94 |

EXAMPLE 5

*Preparation of 1-pentachlorophenyl, 1,2-ditolyl ethane*

A solution of 87.2 grams of 1-pentachlorophenyl, 1,2-dibromo ethane in 300 cc. of toluene was added drop-wise to 4 grams of aluminum chloride in 100 cc. of toluene. The mixture was gradually brought to a temperature of 55° C. and maintained at this point, until the evolution of HCl had become negligible. Distillation yielded 64 grams of a thick, viscous material with a boiling point of 210–235° C. at a reduced pressure of 0.6 mm., i. e. a yield of 67%. This product is a mixture of the various isomers that can be formed when the toluene is coupled. These isomers, of course, exhibit similar physical characteristics and are difficult to separate by ordinary means.

EXAMPLE 6

*Preparation of pentachlorophenyl, diphenyl methane*

27.8 grams of pentachlorobenzaldehyde were dissolved in 250 cc. of 98% sulfuric acid. To this solution was added dropwise with agitation 50 cc. of benzene. The temperature slowly rose to 41° C., and the reaction mixture turned from yellow to an orange brown color. The temperature was maintained with agitation at 40° C. for three hours, at the end of which time the reaction mixture was poured onto 2 liters of crushed ice. Benzene was added and the organic layer separated from the water layer. The organic layer was then washed with water, with 10% sodium hydroxide, with water again, and dried with magnesium sulfate. The benzene was removed under a vacuum leaving a solid, tan colored residue which possessed a melting point of 110–165° C. This solid was distilled at highly reduced pressure to give a fraction boiling at 230–235° C. at 1.4 mm. A yield of 5 grams of the desired product was thus obtained. The product melted at 123–128° C. and, upon recrystallization from a benzene–alcohol mixture had a melting point of 127–129° C. The mixed melting point with the material from Example 2 gave no depression.

The intermediates used in the Friedel-Crafts reaction described in Examples 2, 4 and 5 are representative of haloalkyl pentachlorobenzenes. However, other intermediates are equally useful. In place of the dibromide described in Example 3, the dichloride may be used. This may be produced by adding chlorine to pentachloro styrene to give the alpha-beta dichloroethyl pentachlorobenzene. In place of the pentachlorobenzal chloride of Example 1, it is possible to use pentachlorobenzal bromide, produced by brominating pentachlorotoluene.

The examples referred to above are representative of the means that may be employed for producing the new compounds of the invention, but it is to be understood that other methods than those described therein may be used, if so desired.

The coupling of two aryl groups to the dihaloalkyl pentachlorobenzene may be accomplished readily, even when the halogens appear on the same carbon atom. The length of the alkyl chain may be 1, 2 or more carbon atoms. The compounds of the invention are extremely stable to oxidation, hydrolysis and thermal decomposition. Despite the fact that they have a high halogen content, electrical properties are outstanding, possibly because chlorine and hydrogen do not appear upon the same or adjacent carbon atoms. The compounds may be used for dielectric purposes in the form of low melting mixtures, or, as in the case of the ditolyl compound produced in Example 5, may be used without further blending, if the product is a liquid. The compounds have an extremely high flash point, and, for this reason can be used at elevated temperatures for heat transfer purposes, flame proofing purposes and the like. They are also useful as intermediates for further syntheses, generally utilizing the unhalogenated aryl groups as a reactive segment.

It is contemplated that more than three aryl rings may be present in the individual molecule. For example, pentachlorophenyl triphenyl methane may be produced.

While the invention has been particularly described with respect to compounds in which five chlorine atoms appear on one aromatic nucleus, it is to be understood that these may be replaced wholly or in part by fluorine or other halogens. Fluorine or a mixture of fluorine and chlorine possesses the same high stability as the corresponding pentachloro compounds. As hydrocarbons for the coupling reaction, there may be mentioned in addition to the benzene and toluene disclosed in the examples, xylene, ethyl benzene, amyl benzene, naphthalene, biphenyl and the like. For applications where extreme stability and inertness are not required, these reacting aromatic nuclei may be further substituted by such groups as amino, sulfonic, nitro, methoxy, carboxy and the like. The sulfonic, carboxy and nitro groups would be introduced after completion of the Friedel-Crafts reaction, since they inhibit the reaction. The amino, methoxy and similar groups could be introduced on the aryl ring before the Friedel-Crafts reaction.

As many apparently widely different embodiments of this invention may be made without departing from the spirit and scope hereof, it is to be understood that the invention is not limited to the specific embodiments hereof except as defined in the appended claims.

What we claim is:

1. Halogenated aromatic compounds conforming to the general formula

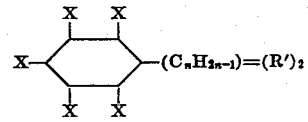

wherein $n$ is an integer from 1 to 10, $R'$ is an aromatic hydrocarbon radical, and $X$ represents a halogen atom.

2. Chlorinated aromatic compounds conforming to the general formula

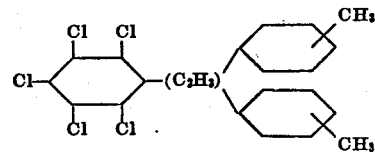

3. 1-pentachlorophenyl, 1,2-diphenyl ethane.
4. Pentachlorophenyl, diphenyl methane.
5. 1-pentachlorophenyl, 1,2-ditolyl ethane.

SIDNEY D. ROSS.
MOUSHY MARKARIAN.

REFERENCES CITED

The following references are of record in the file of this patent:

UNITED STATES PATENTS

| Number | Name | Date |
|---|---|---|
| 2,012,302 | Clark et al. | Aug. 27, 1935 |
| 2,033,612 | Clark et al. | Mar. 10, 1936 |
| 2,244,284 | Britton et al. | June 3, 1941 |

FOREIGN PATENTS

| Number | Country | Date |
|---|---|---|
| 518,149 | Great Britain | Feb. 19, 1940 |
| 770,848 | France | July 9, 1934 |